Jan. 12, 1943.  C. L. NAIMAN ET AL  2,307,895
TREATING HYDROCARBON FLUIDS
Filed March 23, 1940
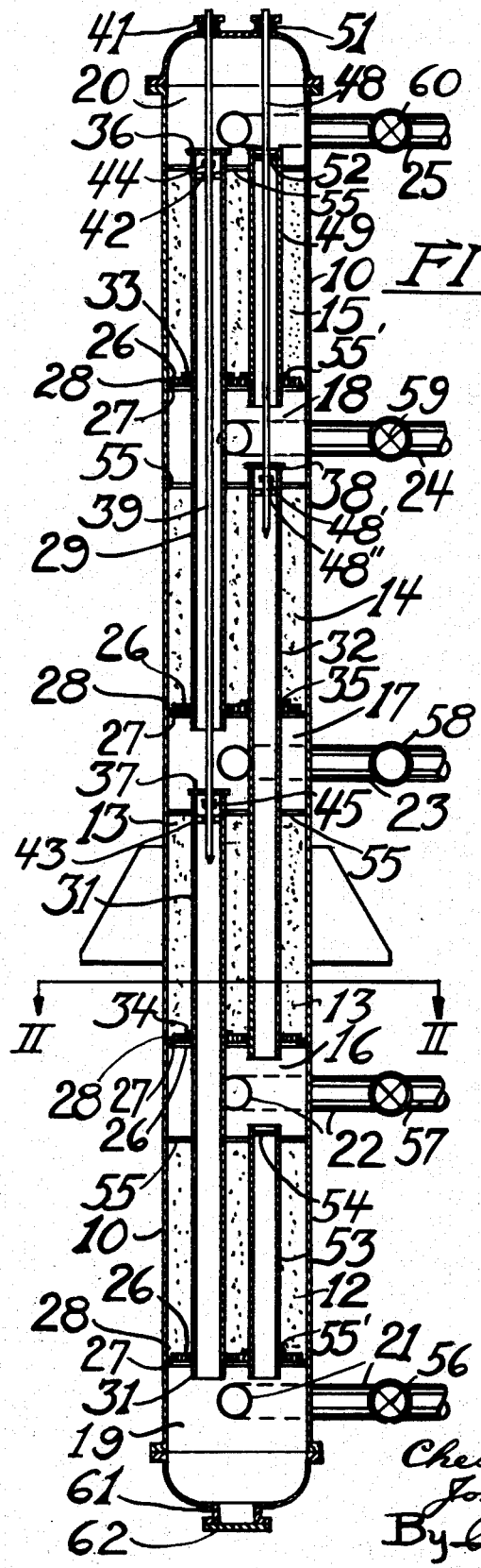
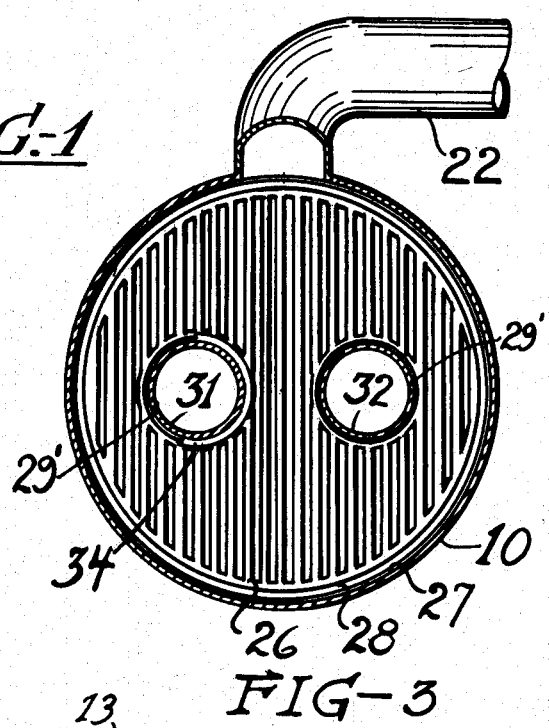
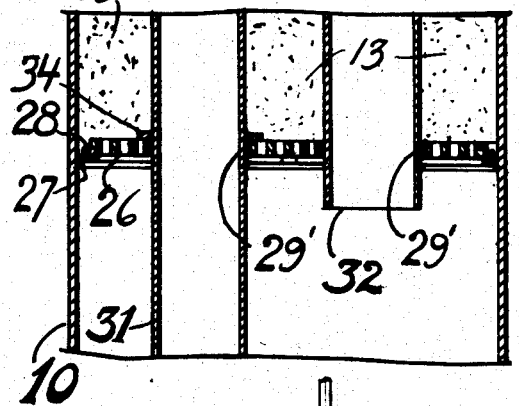
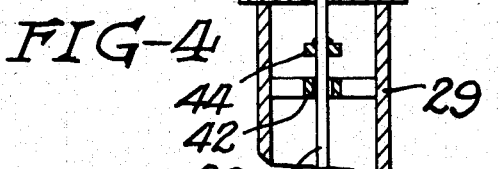
Chester L. Naiman
John M. Graham  Inventors
By P. L. Young  Attorney Patented Jan. 12, 1943

2,307,895

UNITED STATES PATENT OFFICE 2,307,895

TREATING HYDROCARBON FLUIDS

Chester L. Naiman, Linden, and John M. Graham, Dunellen, N. J., assignors to Standard Oil Development Company, a corporation of Delaware Application March 23, 1940, Serial No. 325,486

8 Claims. (Cl. 196—46)

This invention relates to apparatus for treating fluids in the presence of solid contact materials which become fouled with carbonaceous deposits during the treating operation and which must be periodically regenerated to remove such deposits. The invention pertains more particularly to apparatus for accomplishing the treating and regeneration of the contact mass or material alternately in the same reaction chamber.

While the invention in some of its broadest aspects will have a broader application as will appear hereinafter, it is particularly adapted for the catalytic conversion of hydrocarbon oil in the presence of solid adsorbent contact material or catalyst. During this conversion treatment, the contact material or catalyst becomes fouled more or less rapidly with carbonaceous deposits which reduce the activity of the contact material and finally necessitate discontinuance of the process. The activity of this fouled contact material may be restored by subjecting it to a regenerating treatment which will remove such carbonaceous deposits. This can be accomplished by passing an oxidizing gas, such as air or air in admixture with diluent gases, such as steam or combustion products, through the bed of contact material or catalyst to burn the carbonaceous deposits therefrom.

When regenerating in this manner, it has been found that with certain types of materials, such as adsorbent clays, excessive temperatures during the burning operation tend to reduce permanently the activity of the catalyst and it is therefore necessary to control the temperatures during regeneration. Since the regeneration of the catalyst is a highly exothermic reaction, difficulties have been encountered in maintaining the proper temperature control during the regenerating period.

In apparatus of this character involving periodic regeneration of the contact or catalyst mass, it is considered more economical to carry out the regeneration in the same chamber in which the reaction is accomplished so as to avoid catalyst disintegration and the additional expense required to transfer the mass to and from the reaction chamber. When carrying out the regeneration within the reaction chamber, however, the reaction period must be periodically interrupted for a time sufficient to accomplish the regeneration. This results in a reduction in capacity of the equipment to produce a given amount of desired product within a given time. It will therefore be apparent that capacity of the equipment is limited by the time required to accomplish the regeneration and it is desirable to reduce the regenerating period to a minimum.

In operations involving alternate reacting and regenerating periods of the character mentioned, the conditions maintained during the two periods differ widely. For example, during the catalytic cracking of hydrocarbon oils, the velocity of gases passing through the contact mass under optimum conditions is of a different order than the velocity of regenerating gases necessary to accomplish rapid regeneration. As a further example, during the cracking period there is a consumption of heat due to the endothermic heat of reaction whereas during the regenerating period a large amount of heat is liberated which must be removed rapidly to avoid impairment of the activity of the contact mass.

The widely different conditions prevailing during the reaction and regeneration periods present complex problems in constructing reaction chambers which will permit proper and effective control of both periods.

According to this invention an improved apparatus is provided which is adapted for carrying out treating processes in which the mass of contact material is subjected to periodic regenerating treatment.

In the drawing:

Figure 1 represents a vertical sectional view of a reaction chamber constructed in accordance with the invention;

Figure 2 represents a horizontal cross section taken substantially on line II—II of Figure 1;

Figure 3 represents an enlarged partial vertical section taken through an intermediate portion of a lower valved conduit to show the construction for supporting the catalyst bed and the conduit in the vessel; and Figure 4 represents an enlarged detail showing the loose fit between the valve stem and the opening in the valve plate.

Referring now to the drawing, the reference number 10 designates a reaction chamber containing a plurality of vertically spaced beds of catalyst material, 12, 13, 14 and 15, separated by vapor spaces 16, 17 and 18 respectively. The catalyst material preferably comprises particles of solid material. Additional vapor spaces 19 and 20 are provided at the bottom and top of the chamber, respectively. Communicating with the separate vapor zones are conduits 21, 22, 23, 24 and 25 which may be used for the introduction or removal of fluids from the chamber. For convenience, four separate catalyst beds are shown. It will be understood, however, that the invention is not restricted to this number as any desired number may be used.

Each of the catalyst beds 12, 13, 14 and 15 is supported on a perforated grid plate 26, which is held in position by an inwardly extending circumferential flange 27 secured to the internal wall of the reaction chamber 10. In Figure 3 we have shown the construction whereby one of the catalyst beds and one of the conduits are held in position. This same construction is used for the other beds and conduits. To facilitate the assembly of the grid plates in the chamber, the grid plates are of a diameter slightly less than the inner diameter of the flanges 27 and are supported in position after insertion by an intervening segmental ring 28 interposed between the grid plate 26 and the flange 27.

The reaction chamber 10 is provided with an elongated conduit 29 extending longitudinally through the two upper beds of catalyst 14 and 15. Conduit 29 communicates with and forms a vapor passage between the top vapor zone 20 and the middle vapor zone 17. A second elongated conduit 31 extends downwardly through the two lower catalyst beds 12 and 13 and forms a vapor passage between the lower vapor zone 19 and the middle vapor zone 17. Conduit 31 is in alinement with the conduit 29. A third conduit 32 of substantially the same length as conduits 29 and 31 extends through the two intermediate beds 13 and 14 and provides vapor communication between the upper intermediate vapor zone 18 and the lower intermediate vapor zone 16. Conduit 32 is positioned laterally of conduits 29 and 31. Each of the grid plates 26 has openings 29' to permit passage therethrough of conduits 29, 31 and 32 and the blank or dummy conduits to be later described herein.

The vapor conduits 29, 31 and 32 are each provided with outwardly extending circumferential supporting flanges 33, 34 and 35 respectively, intermediate their ends, engaging the grid plates 26. The flanges 33, 34 and 35 are rigidly secured to the conduits in any suitable manner. By supporting the conduits in this manner, the conduits are free to expand or contract longitudinally in both directions from the support with varying temperature conditions.

The conduits 29, 31 and 32 are provided with removable closure or valve plates 36, 37 and 38 respectively, which, when closed, as shown in Fig. 1, rest on the upper ends of the conduits, 29, 31 and 32, respectively, and prevent the passage of vapors through the respective conduits. Valves 36 and 37 are operated by an elongated valve stem 39 which extends downwardly through the stuffing box 41 at the top of the reaction chamber and terminates in the upper end of the conduit 31. The valve stem 39 projects through central openings in the valve plates 36 and 37 and is maintained in axial alinement with the conduits 29 and 31 by guides 42 and 43 positioned within the respective conduits. The central openings in the valve plates 36 and 37 are somewhat larger in diameter than the valve stem to form a loose fit therebetween. See Figure 4 which is an enlarged view showing the loose fit between the valve stem 39 and valve plate 36. A similar construction is provided for the remaining valve plates. Positioned below the closure or valve plates 36 and 37 are ferrules 44 and 45, respectively, rigidly secured to the valve stem 39 adapted to lift the closure valves from the ends of the conduits 29 and 31, respectively, upon raising the valve stem. This construction permits the closure plates to seat themselves properly on the vapor conduits regardless of any slight warping or misalinement of the valve stem and the ferrules may be caused to impart a hammer blow to the closure plates and insure loosening them even though the formation of solid deposits should tend to bind the closure plates to the conduits.

Closure valve 38 for vapor conduit 32 is likewise operated by a valve stem 48 extending through a shorter blank conduit 49 extending through the upper catalyst bed 15 and through stuffing box 51 in the top of the reaction chamber. The closure valve 38 is slidably mounted on the valve stem 48 and operated in the same manner as closure plates 36 and 37. A ferrule 48' is secured to the valve stem 48 and a guide 48" is provided for the valve stem. The conduit 49 has a permanent closure plate 52 welded or otherwise connected therewith which is provided with a central opening through which valve stem 48 extends. The conduit 49 is preferably of the same diameter as the vapor conduits 29, 31 and 32, but is shorter than conduits 29, 31 and 32 and extends only through catalyst bed 15.

The bottom catalyst bed is likewise provided with a short blank conduit 53 of the same diameter as vapor conduits 29, 31 and 32. Conduit 53 is provided with a permanent closure plate 54 to prevent the passage of vapors therethrough. Conduit 53 extends only through catalyst bed 12. Blank conduits 49 and 53 are provided at their lower ends with circumferential flanges 55' which rest on grid plates 26 and are supported thereby.

By providing blank conduits 49 and 53 passing through the upper and lower beds 12 and 15, respectively, each of the catalyst beds 12, 13, 14 and 15 will have the same volume of catalyst per unit depth. Consequently, when the catalyst beds are of uniform depth each catalyst bed will have the same resistance to the flow of gases therethrough. This is of particular importance when the gases are caused to pass through the separate beds in parallel, such as during the regenerating period as hereinafter described. To insure that all of the beds are of uniform depth, a bench ring 55 secured to the interior wall of the chamber is provided for each catalyst bed.

Lines, 21, 22, 23, 24 and 25 are provided, respectively, with valves 56, 57, 58, 59, 60 in order to control the introduction of fluids into the reaction chamber 10 and to assist in the regeneration of the catalytic mass. The lower portion of the reaction chamber 10 is provided with a flanged opening 61 which is shown in the drawing as normally closed by a plate 62. The opening 61 provides means whereby unvaporized liquids may be withdrawn from the bottom of the reaction chamber 10. If desired, a valved pipe or line may be connected to the flanged opening 61.

By the above construction, fluids to be treated may be introduced into the catalyst chamber at a single point, passed through the separate catalyst beds in series or in parallel and withdrawn at a single point from the reaction chamber. For example, by operating valve stems 39 and 48 to close valve plates 36, 37 and 38 and by closing valves in conduits 22, 23 and 24, fluids may be introduced into one end of the reaction chamber through conduit 21 and passed successively through each catalyst bed and withdrawn from the opposite end through line 25. Or the fluids may be introduced through line 25 and passed through each catalyst bed and withdrawn through line 21. By opening valve plates 36, 37 and 38 and closing valves 56, 59 and 60 in conduit 21, 24 and 25, fluids may be introduced through central conduit 23 communicating with the central vapor space 17. A portion of the fluids so introduced is passed downwardly through the lower intermediate catalyst bed 13, and is discharged through conduit 22. Another portion passes upwardly through the upper intermediate catalyst bed 14, then downward through conduit 32 to the outlet conduit 22.

A further portion of the fluid passes directly upward through vapor conduit 29 to the vapor space 20 in the upper end of the chamber and thence downwardly through the top catalyst bed 15 and thence through conduit 32 to the discharge conduit 22 and the final portion passes downwardly through vapor conduit 31 to the vapor space 19 and thence upwardly through the lowest catalyst bed 12 after which it will combine with fluids passing through the lower intermediate bed and will discharge through outlet conduit 22.

By closing valve 57 in conduit 22, and opening valve 59 in conduit 24, the fluids may be discharged through conduit 24 rather than through conduit 22. It will be apparent that the flow of fluids may be the reverse of that just described, namely, the fluids may be introduced either through conduits 22 or 24 and discharged through conduit 23. Also fluids may be introduced to the chamber through the top or bottom conduits and after passing in parallel through the several beds be discharged through intermediate conduits 22 or 24 or vice versa. For example, fluids may be introduced through the upper conduit 25 and then take the following path. A portion of the fluids may pass directly down through the upper bed 15 and discharge through conduit 24 or continue through conduit 32 and discharge through conduit 22. The remainder of the fluids will pass downwardly through the upper vapor conduit 29 to the central vapor space 17 from which a portion will pass upwardly through the upper intermediate catalyst bed 14, another portion will pass downwardly through the lower intermediate bed 13 and the remainder will pass through the lower vapor conduit 31 and thence upwardly through the lower bed 12 and discharge through conduit 22 or 24. Likewise the fluids may be passed into the chamber through the lowest conduit 21, and, after passing in parallel through the respective catalyst beds, withdrawn either through conduit 22 or conduit 24 or vice versa.

It will thus be apparent that the fluids may be optionally introduced through any one of the conduits, passed in parallel through the beds and then withdrawn through any one of the other conduits except, of course, that the fluids cannot be introduced through one conduit and withdrawn through another conduit in direct communication with the entrance conduit by the internal vapor conduits. In each of the flows above described in which a parallel arrangement is obtained the fluids pass in opposite directions through adjacent beds.

From the foregoing, it will be understood that the invention in its broader aspects is not limited to any specific flow through the various catalyst beds. When more than four catalyst beds are provided in each chamber, alternate vapor spaces are directly interconnected preferably by means of internal vapor conduits as hereinbefore described, to permit the fluids to flow in parallel through the separate catalyst beds, and the intervening vapor spaces are interconnected to permit removal of the fluids after passing through a single catalyst bed. The construction thus provides a simple and flexible means for permitting the fluids to flow either in series or in parallel through the various catalyst beds.

When it becomes necessary to regenerate the contact material, it is desired to effect regeneration rapidly. In order to reduce the regenerating period to a minimum and thus reduce the time in which the reaction chamber is out of operation, it is desirable to pass the necessary volume of regenerating gases through the catalyst in the shortest possible time. However, the resistance of the catalyst mass to the passage of gases therethrough varies with the square of the velocity of the gases and the length of catalyst mass. By dividing the regenerating gases and passing separate portions thereof through the individual beds in parallel rather than passing all of the gases through all of the beds in series, the velocity of gases passing through the individual beds and the length of pass in each individual bed are reduced in direct proportion to the number of catalyst beds employed, thus lowering pumping and equipment costs.

On the other hand during the reaction period, the yield of desired end products is a function of the time of contact of the fluids with the catalyst mass which, for a reaction chamber of given dimensions, is determined by the linear velocity of the gases and the depth of catalyst through which they pass. The desired degree of conversion or in other words, yield of desired end products can be controlled, therefore, by modifying either the depth of catalyst or catalyst mass for a given linear velocity or linear velocity of fluids for a given depth of catalyst. As a practical matter, however, it is desirable to impart a minimum linear velocity to the fluids sufficient to insure uniform distribution of the fluids throughout the full cross-sectional area of the catalyst in all beds. To obtain the required time of contact without reducing the linear velocity below the desired minimum, the fluids to be reacted may be passed in series through the separate beds.

The reaction chamber above described may be use in various types of treatments involving alternate treatment in the presence of a solid contact mass and regeneration of the mass in the same reaction chamber. It is of particularly application, however, in the cracking or conversion of hydrocarbon fluids. The hydrocarbon fluid to be converted may be a condensate stock such as gas oil. Other hydrocarbon fluids may be treated in the apparatus. The charging hydrocarbon oil is heated by suitable heat exchange and/or fired heat in a coil to a temperature of about 700 to 1,000° F. and vaporized. The unvaporized portions of the oil are preferably removed from the vapor in a suitable separator. The hydrocarbon vapors are introduced into the bottom of the reaction chamber 10 by means of line 21. The pressure within the reaction chamber is preferably substantially atmospheric although a moderate superatmospheric pressure of about 50 to 100 pounds per square inch may be used. When the reaction chamber 10 is being used for converting hydrocarbon fluids, the valves 57, 58 and 59 in lines 22, 23 and 24, respectively, are closed. The valve 60 in line 25 which communicates with the top vapor space 20 is open to permit passage of the products of conversion leaving the reaction chamber 10.

During the conversion treatment the valves 36, 37 and 38 associated with conduits 29, 31 and 32, respectively, are closed. The hydrocarbon vapors introduced by means of line 21 into the bottom vapor space 19 pass upwardly successively through the catalyst beds 12, 13, 14 and 15 and during passage through the reaction chamber 10 the hydrocarbon vapors are converted to lower boiling hydrocarbons.

The products of conversion leaving the top of the reaction chamber 10 through line 25 may be passed through a heat exchanger (not shown) and then to a suitable separating and fractionating tower (not shown) wherein the vapors are fractionated to separate recycle condensate from vapors. The vapors passing overhead are cooled to condense and separate a desired motor fuel fraction from gases. The recycle condensate is withdrawn from the bottom of the fractionating tower and may be heated and recycled through the reaction zone or chamber 10 with fresh feed. Intermediate boiling fractions between the motor fuel fraction and recycle condensate such as kerosene and distillate fuel oils may also be withdrawn from the fractionating tower.

The cracking catalyst may be of any type capable of bringing about the desired cracking reaction. By way of example, hydrosilicates of alumina which are naturally active or which have been made active by suitable treatment, such as with acid, may be employed to advantage. Also synthetic gels consisting principally of silica and alumina may be employed. The time of contact of the oil vapors with the catalyst will depend upon the nature of catalyst used, the temperature maintained, the desired degree of conversion and other factors. In general, the time of contact may be of the order of from .15 to 5.0 volumes of liquid feed per volume of catalyst per hour. The oil after being subjected to the desired degree of cracking in the reaction chamber 10 is withdrawn through conduit 25. Conversely, as mentioned before, oil vapors may enter chamber 10 through conduit 25 and be withdrawn through conduit 21.

After the hydrocarbon vapors have been passed through the reaction chamber 10 for some time the catalystic mass will become fouled with carbonaceous deposits formed during the cracking or conversion operation. The activity of the catalyst is reduced and in order to reactivate the catalyst it is necessary to regenerate the catalyst. After a conversion operation and before beginning a regeneration period the catalytic mass should be purged with inert gas such as steam or combustion gases in order to remove hydrocarbon vapors from the reaction chamber 10.

During regeneration, valve 56 in line 21, valve 57 in line 22 and valve 60 in line 25 are closed while valve 58 in line 23 and valve 59 in line 24 are open. The catalyst is regenerated by the introduction of an oxidizing gas, for an example, a mixture of air and diluent gases such as steam or spent combustion gases. The regenerating gas is introduced into the reaction chamber 10 by means of a blower or the like and the regenerating gas before being introduced into the reaction chamber 10 is first preheated to a temperature sufficient to initiate combustion of the solid carbonaceous deposits contained on the surface of the catalyst.

During regeneration the internal valve plates 36, 37 and 38 in chamber 10 are in raised position so that the regenerating gases are caused to pass in parallel through the beds 12, 13, 14 and 15 of catalyst material positioned in the reaction chamber 10. The preheated regenerating gases are introduced into the reaction chamber 10 through the inlet conduit 23 and pass through the beds of catalyst material in parallel as hereinbefore described. During regeneration the hot combustion gases are withdrawn from the reaction chamber through line 22.

The combustion gases resulting from regeneration of the catalyst are withdrawn from chamber 10 and may be passed from the system as waste gases but are preferably used as a diluent for the oxidizing gas in order to control the oxidation of the carbonaceous material on the catalyst during regeneration. All or a portion of the combustion gases may be sent to a heat recovery system such as a waste heat boiler (not shown) or other means for the recovery of energy therefrom. The gases to be employed as a diluent are cooled in any suitable manner as by quenching with water and are then admixed with fresh regenerating gas which is to be introduced into the reaction chamber 10. At the completion of a regeneration period and after the air supply has been discontinued, inert gases such as steam or combustion gases are continuously circulated through the chamber 10 to remove residual oxygen-containing gases retained in the chamber.

While the apparatus has been described with reference to the catalytic cracking of hydrocarbon oil, it will be understood that the invention in its broader aspects will have a more general application, such as, for example, the filtration of hydrocarbon oils, the clay treatment of cracked distillates, catalytic reforming of naphthas, the desulfurization of petroleum distillates, the polymerization of hydrocarbons, the destructive or non-destructive hydrogenation of hydrocarbon oils and the synthesis of hydrocarbons from carbon monoxide and hydrogen, etc. In all of these operations above mentioned, the contact material more or less gradually becomes fouled with carbonaceous or sulfur bearing deposits making it desirable to periodically regenerate the contact mass and this is preferably done as above described.

While a specific form of apparatus has been described it is to be understood that the invention is not limited thereto and modifications and changes may be made without departing from the spirit of the invention.

We claim:

1. An apparatus adapted for treating fluids including an outer shell forming an enclosed vertical vessel, a plurality of catalyst beds supported within said vessel in spaced relation to form zones therebetween and at the top and bottom of said vessel, means for introducing fluids into said vessel and into any one of said zones, conduits positioned within said vessel and extending through certain of said catalyst beds, means operable from outside said vessel for closing said conduits to thereby cause said fluids to pass through said catalyst beds in series, said last named means comprising closure members adapted to removably engage one end of each of said conduits, valve stems extending longitudinally of said conduits and projecting outside of said vessel, said valve stems extending through openings in said closure members, each of said openings having a diameter larger than the diameter of said valve stem to provide a sliding fit therebetween, said valve stems being movable longitudinally of said conduits, means secured to each of said valve stems for engaging said closure members upon movement of said valve stems in one direction to remove said closure members from said conduits so that the fluids introduced into said vessel are distributed to each of said catalyst beds whereby said fluids may be caused to pass through said beds in parallel, and means for removing fluids from said vessel.

2. An apparatus adapted for treating fluids including an outer shell forming an enclosed vertical vessel, a plurality of catalyst beds supported within said vessel in spaced relation to form zones therebetween and at the top and bottom of said vessel, valved lines communicating with each of said zones whereby fluids may be introduced into said vessel and withdrawn therefrom at desired points, conduits positioned within said vessel and extending through certain of said beds whereby said fluids may be caused to pass through said beds in parallel when said conduits are open, means operable from outside said vessel for closing said conduits to thereby cause said fluids to pass through said catalyst beds in series, said last named means comprising closure members adapted to removably engage one end of each of said conduits, valve stems extending longitudinally of said conduits and projecting outside of said vessel, said valve stems extending through openings in said closure members and having a sliding fit therewith, said valve stems being movable longitudinally of said conduits and means secured to said valve stems for engaging said closure members upon movement of said valve stems in one direction to remove said closure members from said conduits and to open said conduits.

3. An apparatus including an outer shell forming an enclosed vertical vessel, a plurality of catalyst beds supported within said vessel in spaced relation to form zones therebetween and at the top and bottom of said vessel, means for introducing fluids into and withdrawing fluids from said vessel, elongated conduits positioned within said vessel to distribute fluids so introduced to each of said catalyst beds whereby when said conduits are open said fluids are passed through said beds in parallel, means operable from outside said vessel for closing said conduits to thereby cause said fluids to pass through said catalyst beds in series, said last named means comprising closure members adapted to removably engage one end of each of said conduits, valve stems extending longitudinally of said conduits and projecting outside of said vessel, said valve stems being movable longitudinally of said conduits and means secured to said valve stems for engaging said closure members upon movement of said valve stems in one direction to remove said closure members from said conduits.

4. An apparatus of the character described including elongated vertical vessel, a plurality of catalyst beds supported within said vessel in spaced relation to form zones therebetween and at the top and bottom of said vessel, valved lines extending from said vessel and communicating with said zones whereby fluids may be introduced into or withdrawn from said vessel at desired points, a plurality of alined conduits extending through certain of said catalyst beds, said conduits being spaced and having adjacent ends in one of said zones, another conduit extending through certain of said catalyst beds and out of alinement with but substantially parallel to said first mentioned conduits, closure members for one end of each of said conduits, a single valve stem projecting outside said vessel and associated with said alined conduits and provided with means for engaging closure members on said alined conduits for removing them from said conduits when desired, means for removing said closure member from said other conduit, said conduits being so arranged to distribute fluids introduced into said vessel to each of said catalyst beds whereby when said conduits and certain of said valve lines are open the conduits serve to distribute the fluids to each of said catalyst beds whereby the fluids are caused to pass through said beds in parallel.

5. An apparatus adapted for treating hydrocarbon fluids including an outer shell forming an enclosed vessel, a plurality of catalyst beds supported within said vessel in spaced relation to form vapor zones therebetween, means for introducing hydrocarbons into one end of said vessel, means for withdrawing treated hydrocarbons from the other end of said vessel after they have passed through said beds in series, vapor conduits positioned within said vessel and extending through certain of said beds, means operable from outside said vessel for closing said vapor conduits to thereby cause said hydrocarbons to pass through said catalyst beds in series, said last named means comprising closure members adapted to removably engage one end of each of said conduits, valve stems extending longitudinally of said vapor conduits and projecting outside of said vessel, said valve stems being movable longitudinally of said vapor conduits, means secured to said valve stems for engaging said closure members upon movement of said valve stems in one direction to remove said closure members from said conduits whereby oxidizing gases may be passed through said conduits and through said catalyst beds in parallel to regenerate said catalyst beds, and valved pipes communicating with certain of said intermediate vapor zones for introducing oxidizing gases into said vessel and withdrawing gases from said vessel.

6. An apparatus adapted for treating fluids including an outer shell forming an enclosed vertical vessel, a plurality of catalyst beds supported within said vessel in spaced relation to form zones therebetween, and at the top and bottom of said vessel, valved lines extending laterally from said vessel and communicating with intermediate zones whereby regenerating gases may be introduced into said vessel and withdrawn therefrom, conduits positioned within said vessel and extending through certain of said beds whereby said gases may be caused to pass through said beds in parallel when said conduits are open, means operable from outside said vessel for closing said conduits to thereby cause hydrocarbon fluids to pass through said catalyst beds in series, said last named means comprising closure members adapted to removably engage one end of each of said conduits, valve stems extending longitudinally of said conduits, and projecting outside of said vessel, said valve stems extending through openings in said closure members and having a sliding fit therewith, said valve stems being movable longitudinally of said conduits and means secured to said valve stems for engaging said closure members upon movement of said valve stems in one direction to remove said closure members from said conduits and to open said conduits.

7. An apparatus of the character described including an elongated vertical vessel, a plurality of catalyst beds supported within said vessel in spaced relation to form zones therebetween and at the top and bottom of said vessel, valved lines extending from said vessel and communicating with said zones whereby fluids may be introduced into or withdrawn from said vessel at desired points, a plurality of alined conduits extending through certain of said catalyst beds, said conduits being spaced and having adjacent ends in one of said zones, another conduit extending through certain of said catalyst beds and out of alinement with but parallel to said first mentioned conduits, closure members for one end of each of said conduits, a single valve stem projecting outside said vessel and associated with said alined conduits and provided with means for engaging closure members on said alined conduits for removing them from said conduits when desired, means for removing said closure member from said other conduit, said conduits being so arranged to distribute fluids introduced into said vessel to each of said catalyst beds whereby when said conduits and certain of said valve lines are open the conduits serve to distribute the fluids to each of said catalyst beds whereby the fluids are caused to pass through said beds in parallel and blank conduits in alinement with said other conduit and extending through certain of said beds so that said catalyst beds will each have the same volume of catalyst per unit depth.

8. A catalyst converter comprising an outer shell forming an enclosed vessel, a plurality of catalyst beds supported within said vessel in spaced relation to form vapor zones therebetween, means for introducing gases at one end of said vessel, vapor conduits positioned within said vessel to distribute gases so introduced to each of said catalyst beds whereby said gases may be caused to pass through said beds in parallel, means operable from outside said vessel for closing said vapor conduits to thereby cause said gases to pass through said catalyst beds in series, said last named means comprising closure members adapted to removably engage one end of said conduits, valve stems extending longitudinally of said vapor conduits and projecting outside of said vessel, said valve stems extending through openings in said closure members, said openings having a diameter substantially larger than the diameter of said valve stem to thereby provide a sliding fit therebetween, means for moving said valve stem longitudinally of said vapor conduits and means secured to said valve stems engaging said closure members upon extended movement of said valve stems to remove said closure members from said conduits, and means for removing gases from said chamber.

CHESTER L. NAIMAN.
JOHN M. GRAHAM.